(12) United States Patent
Xiao et al.

(10) Patent No.: US 11,728,470 B2
(45) Date of Patent: Aug. 15, 2023

(54) LITHIUM METAL NEGATIVE ELECTRODE AND METHOD OF MANUFACTURING THE SAME

(71) Applicant: GM GLOBAL TECHNOLOGY OPERATIONS LLC, Detroit, MI (US)

(72) Inventors: Xingcheng Xiao, Troy, MI (US); Mengyuan Chen, Madison Heights, MI (US); Qinglin Zhang, Novi, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 17/128,974

(22) Filed: Dec. 21, 2020

(65) Prior Publication Data
US 2022/0199970 A1   Jun. 23, 2022

(51) Int. Cl.
*H01M 4/1395* (2010.01)
*H01M 10/052* (2010.01)
(Continued)

(52) U.S. Cl.
CPC ....... *H01M 4/1395* (2013.01); *H01M 4/0402* (2013.01); *H01M 4/134* (2013.01);
(Continued)

(58) Field of Classification Search
CPC .. H01M 4/0402; H01M 4/134; H01M 4/1395; H01M 4/366; H01M 4/382;
(Continued)

(56) References Cited

U.S. PATENT DOCUMENTS

| 8,974,946 B2 | 3/2015 | Cai et al. |
| 9,123,939 B2 | 9/2015 | Xiao et al. |

(Continued)

FOREIGN PATENT DOCUMENTS

| CN | 114649506 A | 6/2022 |
| DE | 102021111986 A1 | 6/2022 |
| WO | WO-2017045573 A1 | 3/2017 |

*Primary Examiner* — Ula C Ruddock
*Assistant Examiner* — Scott J. Chmielecki
(74) *Attorney, Agent, or Firm* — Harness, Dickey & Pierce, P.L.C.

(57) ABSTRACT

A negative electrode for an electrochemical cell of a secondary lithium metal battery is manufactured by a method in which a precursor solution is applied to a major surface of a lithium metal substrate to form a precursor coating thereon. The precursor solution includes an organophosphate, a nonpolar organic solvent, and a lithium-containing inorganic ionic compound dissolved therein. At least a portion of the nonpolar organic solvent is removed from the precursor coating to form a protective interfacial layer on the major surface of the lithium metal substrate. The protective interfacial layer exhibits a composite structure including a carbon-based matrix component and a lithium-containing dispersed component. The lithium-containing dispersed component is embedded in the carbon-based matrix component and includes a plurality of lithium-containing inorganic ionic compounds, e.g., lithium phosphate ($Li_3PO_4$) and lithium nitrate ($LiNO_3$).

19 Claims, 1 Drawing Sheet

(51) Int. Cl.
*H01M 4/134* (2010.01)
*H01M 4/66* (2006.01)
*H01M 4/62* (2006.01)
*H01M 4/36* (2006.01)
*H01M 4/04* (2006.01)
*H01M 4/38* (2006.01)
*H01M 4/02* (2006.01)

(52) U.S. Cl.
CPC ........... *H01M 4/366* (2013.01); *H01M 4/382* (2013.01); *H01M 4/628* (2013.01); *H01M 4/661* (2013.01); *H01M 10/052* (2013.01); *H01M 2004/027* (2013.01)

(58) Field of Classification Search
CPC .... H01M 4/628; H01M 4/661; H01M 10/052; H01M 2004/027
See application file for complete search history.

(56) References Cited

U.S. PATENT DOCUMENTS

| | | |
|---|---|---|
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 10,991,946 B2 | 4/2021 | Xiao et al. |
| 11,094,996 B2 | 8/2021 | Xiao et al. |
| 11,101,501 B2 | 8/2021 | Liu et al. |
| 11,239,459 B2 | 2/2022 | Yersak et al. |
| 11,328,878 B2 | 5/2022 | Dai et al. |
| 2014/0265557 A1 | 9/2014 | Huang et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0349307 A1 | 12/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2019/0372155 A1 | 12/2019 | Yersak et al. |
| 2019/0393549 A1 | 12/2019 | Yersak et al. |
| 2020/0119338 A1* | 4/2020 | Jang ................ H01M 4/405 |
| 2020/0119340 A1* | 4/2020 | Jang ................ H01M 10/446 |
| 2020/0119353 A1* | 4/2020 | Jang ................ H01M 4/366 |
| 2020/0220162 A1* | 7/2020 | Jang ................ H01M 10/052 |
| 2020/0220196 A1* | 7/2020 | Jang ................ H01M 50/489 |
| 2020/0395630 A1 | 12/2020 | Yersak et al. |
| 2022/0293925 A1* | 9/2022 | Cooke ................ H01M 4/1397 |
| 2023/0104888 A1* | 4/2023 | Masaki ............... H01M 4/1391 |
| | | 429/223 |

* cited by examiner

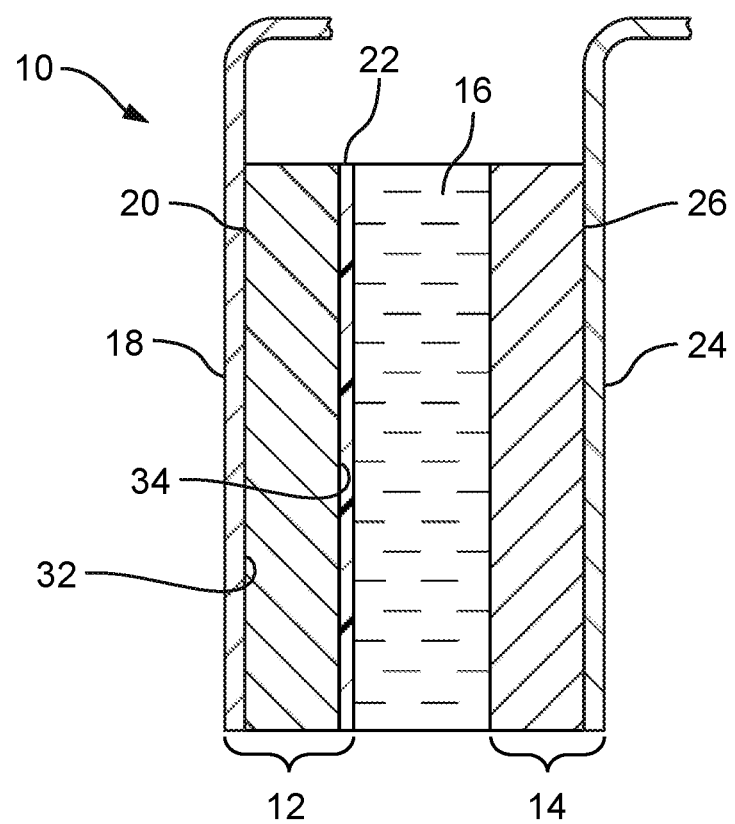

LITHIUM METAL NEGATIVE ELECTRODE AND METHOD OF MANUFACTURING THE SAME

GOVERNMENT LICENSE RIGHTS

This invention was made with Government support under DE-EE0008863 awarded by the Department of Energy (DOE). The Government has certain rights in this invention.

INTRODUCTION

The present invention relates to lithium metal batteries and, more particularly, to interfacial coatings for lithium metal negative electrodes.

Lithium metal is a desirable negative electrode material for secondary lithium metal batteries due to its high specific capacity (3,860 mAh/g) and its relatively low reduction potential (−3.04 V versus standard hydrogen electrode). When lithium metal is used as the negative electrode material in a battery, the lithium metal in the negative electrode is oxidized to lithium ions ($Li^+$) during discharge of the battery and the lithium ions travel from the negative electrode, through the electrolyte, to the positive electrode, where the lithium ions are stored. When the battery is recharged, the lithium ions are released from the positive electrode and travel from the positive electrode, through the electrolyte, and back to the negative electrode, where the lithium ions are reduced to lithium metal and re-deposited. The rate at which a lithium metal battery can be discharged and re-charged (or cycled) is dependent upon the rate at which lithium metal is oxidized to lithium ions at the negative electrode and the rate at which lithium ions are reduced to lithium metal and re-deposited at the negative electrode. In addition, the amount of lithium metal available to participate in the oxidation and reduction reactions during discharge and recharge of the battery is dependent upon the efficiency at which the lithium ions can be stripped from and redeposited at the negative electrode without undergoing irreversible side reactions, which may consume active lithium and reduce battery life.

During the first charge of a lithium metal battery, an electrically insulating and ionically conductive layer referred to as a solid electrolyte interphase (SEI) may inherently form in-situ on a surface of the negative electrode at an interface between the negative electrode and the electrolyte. This native SEI is believed to inherently form due to reduction of the electrolyte by the lithium metal of the negative electrode and may help prevent further physical contact and undesirable side reactions from occurring between the lithium metal of the negative electrode and the electrolyte during operation of the battery. In addition, the formation of a native SEI may help ensure the even distribution and deposition of lithium ions on the negative electrode during battery recharge, which may help prevent lithium dendrite nucleation and growth on the negative electrode. However, the mechanical stability and flexibility of a native SEI may be inadequate to compensate for the large volumetric changes of the negative electrode that necessarily occur during battery cycling. If the structure of the native SEI cannot accommodate such repeated volumetric changes, the repeated damage and breaking of the native SEI may lead to inhomogeneous lithium plating, undesirable side reactions between the electrolyte and exposed lithium metal, as well as the possibility of lithium dendrite formation. In addition, the in-situ formation of a native SEI is believed to result from decomposition of the electrolyte and the consumption of active lithium, which may lead to capacity fading, increased battery resistance, and poor power density. Therefore, there is a need in the art for a method of forming an electrically insulating and ionically conductive layer on the surface of a lithium metal negative electrode that exhibits good mechanical stability and flexibility and can inhibit the occurrence of undesirable side reactions between the lithium metal of the negative electrode and the electrolyte during battery cycling. In addition, it would be beneficial if such layer could improve the uniformity and rate at which lithium ions are repeatedly stripped from and redeposited at the negative electrode in order to improve the charging rate and coulombic efficiency of secondary lithium metal batteries.

SUMMARY

In a method of manufacturing a negative electrode for an electrochemical cell of a secondary lithium metal battery, a precursor solution is applied to a major surface of a lithium metal substrate to form a precursor coating thereon. The precursor solution may include an organophosphate, dissolved lithium ions, dissolved inorganic oxyanions, and a nonpolar organic solvent. At least a portion of the nonpolar organic solvent may be removed from the precursor coating to form a protective interfacial layer on the major surface of the lithium metal substrate. The protective interfacial layer may exhibit a composite structure including a carbon-based matrix component and a lithium-containing dispersed component embedded in the carbon-based matrix component. The lithium-containing dispersed component may include a plurality of lithium-containing inorganic ionic compounds.

The organophosphate may comprise at least one of trimethyl phosphate, triethyl phosphate, tris(1,3-dichloro-2-propyl) phosphate, tris(2-chloroethyl) phosphate, tris(1-chloro-2-propyl) phosphate, tetraethyl pyrophosphate, or tris(2-methylphenyl) phosphate.

The dissolved inorganic oxyanions may comprise nitrate ($NO_3^-$) ions and/or phosphate ($PO_4^{3-}$) ions.

The nonpolar organic solvent may comprise at least one of diethyl ether, 1,2-dimethoxy ethane, carbon tetrachloride, benzene, hexane, or methylene chloride.

The precursor solution may be prepared by mixing the organophosphate with the nonpolar organic solvent to form a solvent mixture. Then, a lithium-containing inorganic ionic compound may be dissolved in the solvent mixture to form the precursor solution. In such case, the lithium-containing inorganic ionic compound may comprise lithium nitrate ($LiNO_3$).

The organophosphate and the nonpolar organic solvent may be mixed together in relative amounts such that a weight ratio of the organophosphate to the nonpolar organic solvent in the solvent mixture is about 1:10.

The lithium-containing inorganic ionic compound may be dissolved in the solvent mixture in an amount relative to the amount of the organophosphate in the solvent mixture. In such case, a molar ratio of the lithium-containing inorganic ionic compound to the organophosphate in the precursor solution may be about 1:1.

A molar concentration of the lithium-containing inorganic ionic compound in the precursor solution may be in a range of greater than 1 mol/L and less than or equal to 7 mol/L.

During formation of the precursor coating, the precursor solution may be applied to the major surface of the lithium metal substrate for a duration sufficient for the organophosphate in the precursor solution to react with lithium on the major surface of the lithium metal substrate to form lithium phosphate ($Li_3PO_4$).

The precursor solution may be applied to the major surface of the lithium metal substrate for a duration in a range of 10 minutes to 2 hours.

The precursor solution may be applied to the major surface of the lithium metal substrate by immersing at least a portion of the lithium metal substrate in the precursor solution or by depositing one or more layers of the precursor solution on the major surface of the lithium metal substrate.

At least a portion of the nonpolar organic solvent may be removed from the precursor coating by heating the precursor coating in an inert gas environment at a temperature in a range of 25° C. to 100° C.

The plurality of lithium-containing inorganic ionic compounds in the lithium-containing dispersed component may comprise lithium phosphate ($Li_3PO_4$) and lithium nitrate ($LiNO_3$).

In a method of manufacturing a negative electrode for an electrochemical cell of a secondary lithium metal battery, a precursor solution may be applied to a major surface of a lithium metal substrate to form a precursor coating thereon. The precursor solution may include trimethyl phosphate, 1,2-dimethoxyethane, and lithium nitrate ($LiNO_3$). At least a portion of the 1,2-dimethoxyethane may be removed from the precursor coating to form a protective interfacial layer on the major surface of the lithium metal substrate. The protective interfacial layer may exhibit a composite structure including a carbon-based matrix component and a lithium-containing dispersed component embedded in the carbon-based matrix component. The lithium-containing dispersed component may include lithium phosphate ($Li_3PO_4$) and lithium nitrate ($LiNO_3$).

The precursor solution may be prepared by mixing the trimethyl phosphate with the 1,2-dimethoxyethane to form a solvent mixture. Then, the lithium nitrate may be dissolved in the solvent mixture to form the precursor solution.

The trimethyl phosphate and the 1,2-dimethoxyethane may be mixed together in relative amounts such that a weight ratio of the trimethyl phosphate and the 1,2-dimethoxyethane in the solvent mixture is about 1:10.

The lithium nitrate may be dissolved in the solvent mixture in an amount relative to the amount of the trimethyl phosphate in the solvent mixture. In such case, a molar ratio of the lithium nitrate to the trimethyl phosphate in the precursor solution may be about 1:1.

A negative electrode for an electrochemical cell of a lithium metal battery is disclosed. The negative electrode may comprise a metal substrate, a lithium metal layer formed on the metal substrate, and a protective interfacial layer formed on a major surface of the lithium metal layer. The protective interfacial layer may exhibit a composite structure including a carbon-based matrix component and a lithium-containing dispersed component embedded in the carbon-based matrix component. The lithium-containing dispersed component may include lithium phosphate ($Li_3PO_4$) and lithium nitrate ($LiNO_3$).

The carbon-based matrix component of the protective interfacial layer may exhibit an amorphous structure, and the lithium-containing dispersed component may be at least partially crystalline.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a side cross-sectional view of an electrochemical cell including a negative electrode, a positive electrode, and an electrolyte in ionic contact with the negative and positive electrodes, wherein the negative electrode includes a negative electrode current collector, a negative electrode active material layer in the form of a lithium metal layer formed on the negative electrode current collector, and a protective interfacial layer formed on the lithium metal layer over the negative electrode current collector.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed method can be used to form a protective layer on an exposed surface of a lithium metal substrate that is configured for use as a lithium metal negative electrode of an electrochemical cell of a secondary lithium metal battery. In assembly, the protective layer may be disposed along an interface between the lithium metal negative electrode and an ionically conductive electrolyte that infiltrates the electrochemical cell. This protective layer may exhibit a composite structure including a carbon-based matrix component and a lithium-containing dispersed component embedded in the carbon-based matrix component. The lithium-containing dispersed component may include a plurality of lithium-containing inorganic ionic compounds, e.g., lithium phosphate ($Li_3PO_4$) and lithium nitrate ($LiNO_3$) compounds. Without intending to be bound by theory, it is believed that the $Li_3PO_4$ and $LiNO_3$ compounds embedded in the protective layer may help prevent undesirable chemical reactions from occurring between the lithium metal of the negative electrode and the electrolyte infiltrating the electrochemical cell, which may increase the uniformity of the lithium stripping and plating processes during repeated cycling of the battery and also may help suppress the formation of lithium dendrites. This is particularly true in embodiments where the electrolyte is carbonate-based, which may be due at least in part to the low solubility of the $Li_3PO_4$ and $LiNO_3$ compounds in carbonate-based electrolytes. The carbon-based matrix component may be a polymeric material including a plurality of carbon-carbon (single and double) bonds and may provide the protective layer with improved mechanical stability and flexibility, as compared to native SEI layers that may otherwise inherently form on lithium metal negative electrodes during the first charge of the electrochemical cell.

The presently disclosed protective layer may be formed on the surface of a lithium metal substrate by application of a precursor solution that includes an organophosphate, dissolved lithium ions, dissolved inorganic oxyanions (e.g., nitrate ($NO_3^-$) ions and/or phosphate ($PO_4^{3-}$) ions), and a nonpolar organic solvent. The term "oxyanion" as used herein refers to a polyatomic ion that contains oxygen. After the precursor solution is applied to the surface of the lithium metal substrate, at least a portion of the nonpolar organic solvent may be removed from the precursor solution to form the protective layer on the surface of the lithium metal substrate. After formation of the protective layer on the surface of the lithium metal substrate, the lithium metal substrate and overlying protective layer may be incorporated into an electrochemical cell of a secondary lithium metal battery and used as the lithium metal negative electrode thereof. Lithium metal negative electrodes that include a composite protective interfacial layer formed by the presently disclosed method have been found to exhibit significantly lower interfacial impedance and increased lithium-ion transfer rates, as compared to lithium metal negative electrodes that have not been treated by the presently disclosed method.

The term "carbon-based," as used herein with respect to the carbon-based matrix component of the composite protective layer, broadly includes materials in which carbon (C) is the single largest constituent on a weight percentage (%) basis. This may include materials having, by weight, greater than 50% carbon, as well as those having, by weight, less than 50% carbon, so long as carbon is the single largest constituent of the material.

The word "about" means plus or minus 5% of the stated number.

The word "substantially" does not exclude "completely." For example, a composition which is "substantially free" from Y may or may not be completely free from Y.

FIG. 1 is a schematic depiction of an electrochemical cell 10 of a secondary lithium metal battery (not shown). The electrochemical cell 10 comprises a negative electrode 12, a positive electrode 14, and an electrolyte 16 in ionic contact with the negative electrode 12 and the positive electrode 14. The negative electrode 12 includes a negative electrode current collector 18, a negative electrode active material layer in the form of a lithium metal layer 20 formed on the negative electrode current collector 18, and a protective interfacial layer 22 formed on the lithium metal layer 20. The positive electrode 14 includes a positive electrode current collector 24 having a positive electrode active material layer 26 formed on the positive electrode current collector 24. The negative and positive electrodes 12, 14 are spaced apart from one another and, in assembly, may be physically separated from one another by a porous separator (not shown). In assembly, the negative electrode 12 may be electrically coupled to the positive electrode 14 via an external circuit (not shown) so that electrons can flow between the negative and positive electrodes 12, 14 while lithium ions simultaneously travel through the electrolyte 16 between the lithium metal layer 20 and the opposing positive electrode active material layer 26 during cycling of the electrochemical cell 10.

The negative electrode current collector 18 may be in the form of a thin and flexible porous or non-porous electrically conductive metal substrate and may comprise a material that is capable of collecting and reversibly passing free electrons to and from the lithium metal layer 20. For example, the negative electrode current collector 18 may comprise an electrically conductive metal or metal alloy, e.g., a transition metal or alloy thereof. In some specific examples, the negative electrode current collector 18 may comprise copper (Cu), nickel (Ni), an iron (Fe) alloy (e.g., stainless steel), or titanium (Ti). Other electrically conductive metals may of course be used, if desired.

The lithium metal layer 20 is disposed on a major surface 32 of the negative electrode current collector 18 and may be physically bonded thereto. The lithium metal layer 20 may comprise a lithium metal alloy or may consist essentially of lithium (Li) metal. For example, the lithium metal layer 20 may comprise, by weight, greater than 97% lithium or, more preferably, greater than 99% lithium. As such, the lithium metal layer 20 preferably does not comprise any other elements or compounds that undergo a reversible redox reaction with lithium during operation of the electrochemical cell 10. For example, the lithium metal layer 20 preferably does not comprise an intercalation host material that is formulated to undergo the reversible insertion or intercalation of lithium ions or an alloying material that can electrochemically alloy and form compound phases with lithium. In addition, the lithium metal layer 20 preferably does not comprise a conversion material or an alloy material that can electrochemically alloy and form compound phases with lithium. Some examples of materials that are preferably excluded from the lithium metal layer 20 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). In addition, the lithium metal layer 20 preferably does not comprise a polymeric binder. Some examples of polymeric binders that are preferably excluded from the lithium metal layer 20 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The lithium metal layer 20 may have a thickness in a range of greater than zero micrometers and less than or equal to 100 micrometers, depending upon the state of charge of the electrochemical cell 10.

The protective interfacial layer 22 creates a protective, electrically insulating and ionically conductive interface between the lithium metal layer 20 and the ionically conductive electrolyte 16 of the electrochemical cell 10 and is formed directly on and over a major surface 34 of the lithium metal layer 20 prior to assembly of the electrochemical cell 10. As such, the protective interfacial layer 22 may be referred to herein as an "artificial" layer to distinguish the protective interfacial layer 22 from the native SEI layers that inherently form in-situ on lithium metal negative electrodes that have not been treated by the presently disclosed method.

In FIG. 1, a single lithium metal layer 20 is formed on the major surface 32 of the negative electrode current collector 18 and a single protective interfacial layer 22 is formed on the major surface 34 of the lithium metal layer 20 over the major surface 32 of the negative electrode current collector 18. In other embodiments, first and second lithium metal layers (not shown) may be formed on opposite first and second sides of the negative electrode current collector 18. In such case, first and second protective interfacial layers (not shown) may be respectively formed over the first and second lithium metal layers on the first and second sides of the negative electrode current collector 18.

The protective interfacial layer 22 exhibits a composite structure including a carbon-based matrix component and a lithium-containing dispersed component. The lithium-containing dispersed component may be at least partially crystalline and includes a plurality of lithium-containing inorganic ionic compounds embedded in and encapsulated by the carbon-based matrix component. The lithium-containing inorganic ionic compounds of the lithium-containing dispersed component may comprise compounds of lithium phosphate ($Li_3PO_4$) and lithium nitrate ($LiNO_3$). The carbon-based matrix component may exhibit an amorphous polymeric structure that includes a plurality of carbon-carbon bonds, which may be single (C—C) or double (C=C) bonds.

In embodiments, the carbon-based matrix component may include, by weight, 1% to 95% carbon. The lithium-containing dispersed component may account for, by weight, 5% to 99% of the protective interfacial layer 22. The carbon-based matrix component may account for, by weight, 1% to 95% of the protective interfacial layer 22. The protective interfacial layer 22 may exhibit a porosity or void volume in a range of 1% to 80%. The protective interfacial layer 22 is ionically conductive and may exhibit an ionic conductivity in a range of $1.0 \times 10^{-7}$ S/cm to 1.0 S/cm. The protective interfacial layer 22 may exhibit a thickness in the range of 10 nanometers to 500 nanometers, or more preferably, in a range of 50 nanometers to 100 nanometers.

The protective interfacial layer 22 may be formed on the major surface 34 of the lithium metal layer 20 or on an exposed surface of another lithium metal substrate (not shown) by applying a precursor solution including a relatively volatile organic compound thereto, and then removing at least a portion of the relatively volatile organic compound therefrom, for example, by evaporation.

The precursor solution used to form the protective interfacial layer 22 includes an organophosphate, dissolved lithium ions, a nonpolar organic solvent, and dissolved inorganic oxyanions, which may comprise nitrate ($NO_3^-$) and/or phosphate ($PO_4^{3-}$) ions.

The organophosphate is selected to enhance the solubility of at least one lithium-containing inorganic ionic compound in the precursor solution and may comprise an alkyl phosphate and/or an aryl phosphate. The alkyl phosphate may comprise a trialkyl phosphate, e.g., trimethyl phosphate, $(CH_3)_3PO_4$, having a boiling point of about 197° C. at 1 Atm, triethyl phosphate, $(C_2H_5)_3PO_4$, having a boiling point of about 215° C. at 1 Atm, tris(1,3-dichloro-2-propyl) phosphate (TDCIPP) having a boiling point of about 326° C. at 1 Atm, tris(2-chloroethyl) phosphate (TCEP) having a boiling point of about 192° C. at 1 Atm, and/or tris(1-chloro-2-propyl) phosphate (TCPP) having a boiling point of about 270° C. at 1 Atm; and/or tetraethyl pyrophosphate (TEPP), having a boiling point of about 124° C. at 1 Atm. The aryl phosphate may comprise a triaryl phosphate, e.g., tris(2-methylphenyl) phosphate, $(C_6H_5CH_3)_3PO_4$, having a boiling point of about 265° C. at 1 Atm.

The nonpolar organic solvent is selected to control and/or adjust the viscosity of the precursor solution and may be relatively volatile, as compared to one or more other components of the precursor solution. The nonpolar organic solvent may comprise an alkyl ether, e.g., diethyl ether $(C_2H_5)_2O$ having a boiling point of about 34.6° C. at 1 Atm, and/or 1,2-dimethoxyethane, having a boiling point of about 85° C. at 1 Atm; carbon tetrachloride ($CCl_4$) having a boiling point of about 77° C. at 1 Atm; benzene ($C_6H_6$) having a boiling point of about 80° C. at 1 Atm; hexane ($C_6H_{14}$) having a boiling point of about 69° C. at 1 Atm; and/or methylene chloride ($CH_2Cl_2$) having a boiling point of about 39.6° C. at 1 Atm.

The precursor solution may be prepared by mixing the organophosphate with the nonpolar organic solvent to form a solvent mixture. A weight ratio of the organophosphate to the nonpolar organic solvent in the solvent mixture may be about 1 to about 10. For example, a weight ratio of the organophosphate to the nonpolar organic solvent in the solvent mixture may be in a range of 1:5 to 1:15, preferably in a range of 1:9 to 1:11. The organophosphate may constitute, by weight, 1-20%, preferably 5-15%, and more preferably about 10% of the solvent mixture. The nonpolar organic solvent may constitute, by weight, 80-99%, preferably 85-95%, and more preferably about 90% of the solvent mixture.

After preparation of a substantially homogenous solvent mixture, a lithium-containing inorganic ionic compound is dissolved in the solvent mixture to form the precursor solution. Upon dissolution in the solvent mixture, the lithium-containing inorganic ionic compound dissociates into lithium cations and inorganic oxyanions. The lithium-containing inorganic ionic compound may comprise lithium nitrate ($LiNO_3$), having a boiling point of about 600° C. at 1 Atm. The lithium-containing inorganic ionic compound may be dissolved in the solvent mixture in an amount relative to the amount of the organophosphate in the solvent mixture. A molar ratio of the lithium-containing inorganic ionic compound to the organophosphate in the precursor solution may be about 1:1. For example, a molar ratio of the lithium-containing inorganic ionic compound to the organophosphate in the precursor solution may be in a range of 1:1 to 2:1, more preferably in a range of 0.9:1 to 1.1:1. The molar concentration of the lithium-containing inorganic ionic compound in the precursor solution may be in a range of greater than 1 mol/L and less than or equal to 7 mol/L. The lithium-containing inorganic ionic compound may constitute, by weight, 1-8% of the precursor solution, the organophosphate may constitute, by weight, 5-12% of the precursor solution, and the nonpolar organic solvent may constitute, by weight, 80-94% of the precursor solution.

The precursor solution may be applied to the major surface 34 of the lithium metal layer 20 to form a precursor coating thereon. The precursor solution may be applied to the major surface 34 of the lithium metal layer 20, for example, by immersing at least a portion of the lithium metal layer 20 in the precursor solution or by depositing one or more layers of the precursor solution on the major surface 34 of the lithium metal layer 20. The precursor solution may be deposited on the major surface 34 of the lithium metal layer 20, for example, using a dip coating, spin coating, layer-by-layer, or spray coating process.

The precursor solution may be applied to or placed in contact with the major surface 34 of the lithium metal layer 20 for a duration sufficient for the organophosphate in the precursor solution to react with lithium on the major surface 34 of the lithium metal layer 20 to form lithium phosphate ($Li_3PO_4$). Without intending to be bound by theory, it is believed that, due to the relatively low electrochemical potential of lithium (−3.04 V versus standard hydrogen electrode, SHE), the organophosphate in the precursor solution may be reduced to lithium phosphate by the lithium metal of the lithium metal layer 20. For example, the precursor solution may be applied to or placed in contact with the major surface 34 of the lithium metal layer 20 for a duration in a range of 10 minutes to 2 hours, and more preferably in a range of 30 minutes to 1 hour. The duration of contact may depend on the concentration of the organophosphate and/or the lithium-containing inorganic ionic compound in the precursor solution.

After formation of the precursor coating on the major surface 34 of the lithium metal layer 20, at least a portion of the relatively volatile nonpolar organic solvent is removed from the precursor coating to form the protective interfacial layer 22 on the major surface 34 of the lithium metal layer 20. A portion of the relatively volatile nonpolar organic solvent may be removed from the precursor coating, for example, by exposing the precursor coating to an inert gas environment (e.g., argon, nitrogen and/or helium) and allowing a portion of the nonpolar organic solvent to evaporate therefrom. In embodiments, the precursor coating may be heated in the inert gas environment at a temperature in a range of 25° C. to 100° C. to evaporate at least a portion of the nonpolar organic solvent from the precursor coating.

After formation of the protective interfacial layer 22 on a major surface of a lithium metal substrate, the lithium metal substrate and overlying protective layer may be formed into the shape of a lithium metal negative electrode and incorporated into an electrochemical cell of a secondary lithium metal battery.

The presently disclosed artificial protective interfacial layer 22 has been found to suppress lithium dendrite formation and to increase the uniformity of the lithium stripping and plating processes at the surface 34 of the lithium metal layer 20 during the repeated charging and discharge cycles of the electrochemical cell 10, which, in turn, has been found to improve the overall cycle stability of the electrochemical cell 10. In addition, the presently disclosed protective interfacial layer 22 has been found to increase the discharge capacity of the electrochemical cell 10, for example, by increasing the amount of active lithium ions that can be stripped from the surface 34 of the lithium metal layer 20 during discharge of the electrochemical cell 10. Without intending to be bound by theory, it is believed that the protective interfacial layer 22 may reduce interfacial impedance at the interface between the lithium metal layer 20 and the electrolyte 16 and also may help facilitate the transfer of lithium ions therebetween.

The protective interfacial layer 22 may exhibit exceptional chemical and mechanical stability in embodiments where the electrolyte 16 comprises a carbonate-based electrolyte, which may be due at least in part to the low solubility of the $Li_3PO_4$ and $LiNO_3$ compounds in carbonate-based electrolytes. A carbonate-based electrolyte, as used herein, refers to a non-aqueous liquid electrolyte that includes a lithium salt dissolved or ionized in a nonaqueous, aprotic organic solvent made of one or more carbonate compounds. For example, a carbonate-based electrolyte may include a lithium salt dissolved or ionized in a cyclic carbonate (i.e., ethylene carbonate, propylene carbonate) or an acyclic carbonate (i.e., dimethyl carbonate, diethyl carbonate, ethyl methyl carbonate).

Formation of the presently disclosed artificial protective interfacial layer 22 on the major surface 34 of the lithium metal layer 20 does not require or involve the consumption of active lithium in the electrochemical cell 10, does not degrade the electrolyte 16, and allows lithium ions ($Li^+$) to effectively pass therethrough during cycling of the electrochemical cell 10.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method of manufacturing a negative electrode for an electrochemical cell of a secondary lithium metal battery, the method comprising:
    applying a precursor solution including an organophosphate, lithium nitrate ($LiNO_3$), and a nonpolar organic solvent to a major surface of a lithium metal substrate to form a precursor coating thereon; and
    removing at least a portion of the nonpolar organic solvent from the precursor coating to form a protective interfacial layer on the major surface of the lithium metal substrate,
    wherein the protective interfacial layer exhibits a composite structure including a carbon-based matrix component and a lithium-containing dispersed component embedded in the carbon-based matrix component, and
    wherein the lithium-containing dispersed component includes a plurality of lithium-containing inorganic ionic compounds.

2. The method of claim 1 wherein the organophosphate comprises at least one of trimethyl phosphate, triethyl phosphate, tris(1,3-dichloro-2-propyl) phosphate, tris(2-chloroethyl) phosphate, tris(1-chloro-2-propyl) phosphate, tetraethyl pyrophosphate, or tris(2-methylphenyl) phosphate.

3. The method of claim 1 wherein the precursor solution comprises dissolved nitrate ($NO_3^-$) ions and/or phosphate ($PO_4^{3-}$) ions.

4. The method of claim 1 wherein the nonpolar organic solvent comprises at least one of diethyl ether, 1,2-dimethoxyethane, carbon tetrachloride, benzene, hexane, or methylene chloride.

5. The method of claim 1 wherein the precursor solution is prepared by:
    mixing the organophosphate with the nonpolar organic solvent to form a solvent mixture; and then
    dissolving the lithium nitrate in the solvent mixture to form the precursor solution.

6. The method of claim 5 wherein the organophosphate and the nonpolar organic solvent are mixed together in relative amounts such that a weight ratio of the organophosphate to the nonpolar organic solvent in the solvent mixture is about 1:10.

7. The method of claim 5 wherein the lithium nitrate is dissolved in the solvent mixture in an amount relative to the amount of the organophosphate in the solvent mixture, and wherein a molar ratio of the lithium nitrate to the organophosphate in the precursor solution is about 1:1.

8. The method of claim 5 wherein a molar concentration of the lithium nitrate in the precursor solution is in a range of greater than 1 mol/L and less than or equal to 7 mol/L.

9. The method of claim 1 wherein the precursor solution is applied to the major surface of the lithium metal substrate for a duration sufficient for the organophosphate in the precursor solution to react with lithium on the major surface of the lithium metal substrate to form lithium phosphate ($Li_3PO_4$).

10. The method of claim 1 wherein the precursor solution is applied to the major surface of the lithium metal substrate for a duration in a range of 10 minutes to 2 hours.

11. The method of claim 1 wherein the precursor solution is applied to the major surface of the lithium metal substrate by immersing at least a portion of the lithium metal substrate in the precursor solution or by depositing one or more layers of the precursor solution on the major surface of the lithium metal substrate.

12. The method of claim 1 wherein at least a portion of the nonpolar organic solvent is removed from the precursor coating by heating the precursor coating in an inert gas environment at a temperature in a range of 25° C. to 100° C.

13. The method of claim 1 wherein the plurality of lithium-containing inorganic ionic compounds in the lithium-containing dispersed component comprise lithium phosphate ($Li_3PO_4$) and lithium nitrate ($LiNO_3$).

14. A method of manufacturing a negative electrode for an electrochemical cell of a secondary lithium metal battery, the method comprising:
    applying a precursor solution including trimethyl phosphate, 1,2-dimethoxyethane, and lithium nitrate ($LiNO_3$) to a major surface of a lithium metal substrate to form a precursor coating thereon; and
    removing at least a portion of the 1,2-dimethoxyethane from the precursor coating to form a protective interfacial layer on the major surface of the lithium metal substrate,
    wherein the protective interfacial layer exhibits a composite structure including a carbon-based matrix component and a lithium-containing dispersed component embedded in the carbon-based matrix component, and
    wherein the lithium-containing dispersed component includes lithium phosphate ($Li_3PO_4$) and lithium nitrate ($LiNO_3$).

15. The method of claim 14 wherein the precursor solution is prepared by:
    mixing the trimethyl phosphate with the 1,2-dimethoxyethane to form a solvent mixture; and then
    dissolving the lithium nitrate in the solvent mixture.

16. The method of claim 15 wherein the trimethyl phosphate and the 1,2-dimethoxyethane are mixed together in relative amounts such that a weight ratio of the trimethyl phosphate and the 1,2-dimethoxyethane in the solvent mixture is about 1:10.

17. The method of claim 15 wherein the lithium nitrate is dissolved in the solvent mixture in an amount relative to the amount of the trimethyl phosphate in the solvent mixture, and wherein a molar ratio of the lithium nitrate to the trimethyl phosphate in the precursor solution is about 1:1.

18. A negative electrode for an electrochemical cell of a lithium metal battery, the negative electrode comprising:
    a metal substrate;
    a lithium metal layer formed on the metal substrate; and
    a protective interfacial layer formed on a major surface of the lithium metal layer,
    wherein the protective interfacial layer exhibits a composite structure including a carbon-based matrix component and a lithium-containing dispersed component embedded in the carbon-based matrix component, and
    wherein the lithium-containing dispersed component includes lithium phosphate ($Li_3PO_4$) and lithium nitrate ($LiNO_3$).

19. The negative electrode of claim 18 wherein the carbon-based matrix component of the protective interfacial layer exhibits an amorphous structure, and wherein the lithium-containing dispersed component is at least partially crystalline.

\* \* \* \* \*